US008676774B2

(12) United States Patent
Bruno et al.

(10) Patent No.: US 8,676,774 B2
(45) Date of Patent: Mar. 18, 2014

(54) MIN-REPRO FRAMEWORK FOR DATABASE SYSTEMS

(75) Inventors: Nicolas Bruno, Redmond, WA (US); Rimma V. Nehme, Indianapolis, IN (US)

(73) Assignee: Microsoft Corp., Redmond, WA (US)

(*) Notice: Subject to any disclaimer, the term of this patent is extended or adjusted under 35 U.S.C. 154(b) by 1392 days.

(21) Appl. No.: 12/408,330

(22) Filed: Mar. 20, 2009

(65) Prior Publication Data

US 2010/0241766 A1    Sep. 23, 2010

(51) Int. Cl.
   *G06F 17/30*    (2006.01)
(52) U.S. Cl.
   USPC .......................................... 707/705
(58) Field of Classification Search
   USPC .......................................... 707/761
   See application file for complete search history.

(56) References Cited

U.S. PATENT DOCUMENTS

| 5,561,763 | A | | 10/1996 | Eto et al. | |
| 6,138,112 | A | * | 10/2000 | Slutz | 707/748 |
| 6,324,683 | B1 | | 11/2001 | Fuh et al. | |
| 2003/0200537 | A1 | * | 10/2003 | Barsness et al. | 717/151 |

OTHER PUBLICATIONS

Andreas Zeller and Ralf Hildebrandt, "Simplifying and Isolating Failure-Inducing Input" IEEE Transactions on Software Engineering, vol. 28 No. 2, Feb. 2002 (http://www.cs.washington.edu/homes/mernst/teaching/6.883/readings/zeller-tse2002.pdf).*

Thomas J. Ostrand and March J. Balcer, "The Category-Partition Method for Specifying and Generating Functional Tests" Communications of the ACM 1988 (http://staff.unak.is/andy/MScTestingMaintenance/Lectures/CategoryPartitionMethod1988.pdf).*

Thomas J. Ostrand and March J. Balcer, "The Category-Partition Method for Specifying and Generating Functional Tests" Communications of the ACM 1988 (http://staff.unak.is/andy/MScTestingMaintenance/Lectures/CategoryPartitionMethod1988.pdf; hereinafter "Ostrand").*

Thomas J. Ostand and March J. Balcer, "The Category-Partition Method for Specifying and Generating Functional Tests" Communications of the ACM 1988 (http://staff.unak.is/andy/MScTestingMaintenance/Lectures/CategoryPartitionMethod1988.pdf.*

Andreas Zeller and Ralf Hildebrandt, "Simplifying and Isolating Failure-Inducing Input" IEEE Transactions on Software Engineering, vol. 28 No. 2, Feb. 2002 (http://www.cs.washington.edu/homes/mernst/teaching/6.883/readings/zeller-tse2002.pdf; hereinafter "Zeller").*

(Continued)

*Primary Examiner* — Don Wong
*Assistant Examiner* — Deric Ortiz
(74) *Attorney, Agent, or Firm* — Steve Wight; Carole Boelitz; Micky Minhas (57) ABSTRACT

The min-repro finding technique described herein is designed to ease and speed-up the task of finding a min-repro, a minimum configuration that reproduces a problem in database-related products. Specifically, in one embodiment, the technique simplifies transformations in order to find one or more min-repros. One embodiment provides a high-level script language to automate some sub-tasks and to guide the search for a simpler the configuration that reproduces the problem. Yet another embodiment provides record-and-replay functionality, and provides an intuitive representation of results and the search space. These tools can save hours of time for both customers and testers to isolate the problem and can result in faster fixes and large cost savings to organizations.

20 Claims, 8 Drawing Sheets

(56) References Cited

OTHER PUBLICATIONS

Zeller Andreas, "Automated Debugging: Are We Close?", retrieved at<<http://ieeexplore.ieee.org/ielx5/2/20799/00963440.pdf?arnumber=963440>>, pp. 6.

Whalley David B. , "Automatic Isolation of Compiler Errors", retrieved at<<http://www.cs.fsu.edu/~whalley/papers/acmtoplas94.ps>>, pp. 1-14.

Zeller et al. , "Finding Failure Causes through Automated Testing", retrieved at<<http://www.infosun.fim.uni-passau.de/st/papers/aadebug2000/aashort.pdf>>, pp. 6.

Burger Martin , "Locating Failure-Inducing Code Changes in an Industrial Environment", retrieved at<<http://www.st.cs.uni-saarland.de/publications/files/burger-thesis-2005.pdf>>, Dec. 14, 2005, pp. 118.

Su et al. , "HDD: Hierarchical Delta Debugging", retrieved at<<http://www.cs.ucdavis.edu/~su/publications/icse06-hdd.pdf>>,May 20-28, 2006, Shanghai, China, pp. 10.

Lu et al. , "Triage: Diagnosing Production Run Failures at the Users Site", retrieved at<<http://opera.cs.uiuc.edu/paper/sosp63-tucek.pdf>>, Oct. 14-17, 2007, Stevenson, Washington, USA, pp. 14.

Gupta et al. , "Dynamic Slicing Long Running Programs through Execution Fast Forwarding", retrieved at<<http://www.cs.purdue.edu/homes/xyzhang/Comp/fse06.pdf>>, Nov. 5-11, 2006, Portland, Oregon, USA, pp. 11.

Zeller Andreas, "Isolating Cause Effect Chains from Computer Programs", retrieved at<<http://www.st.cs.uni-saarland.de/papers/fse2002/p201-zeller.pdf>>, Nov. 18-22, 2002, Charleston, SC, USA, pp. 10.

Kollar et al. , "Database Tuning Advisor for Microsoft SQL Server 2005", retrieved at<<http://www.vldb.org/conf/2004/IND4P3.PDF>>, Proceedings of the 30th VLDB Conference, Toronto, Canada, 2004, pp. 1110-1121.

Bruno et al. , "Constrained Physical Design Tuning", retrieved at<<http://research.microsoft.com/pubs/74116/paper75-revised.pdf>>, Aug. 24-30, 2008, Auckland, New Zealand, pp. 12.

Bruno et al. , "Configuration-Parametric Query Optimization for Physical Design Tuning", retrieved at<<http://www.cs.purdue.edu/homes/mehme/papers/sigmod08cpqo.pdf>>, Jun. 9-12, 2008, Vancouver, BC, Canada , pp. 12.

Nicol Gavin Thomas, "XEXPR—A Scripting Language for XML", retrieved at<<http://www.w3.org/TR/xexpr/>>, Nov. 21, 2000, pp. 1-28.

Balcer,et al. , "The Category-Partition Method for Specifying and Generating Fuctional Tests", retrieved at<<http://portal.acm.org/ft_gateway.cfm?id=62964&type=pdf&coll=GUIDE&dl=GUIDE&CFID=21726511&CFTOKEN=51588138>>, Jun. 1988, pp. 676-686.

Zeller Andreas, "Simplifying and Isolating Failure-Inducing Input", retrieved at<<http://www.cs.purdue.edu/homes/jv/510s05/papers/puff.pdf, IEEE Transactions on Software Engineering, vol. 28, No. 2, Feb. 2002, pp. 1-17.

* cited by examiner

MIN-REPRO FRAMEWORK FOR DATABASE SYSTEMS

Testing and debugging database system applications is often challenging and time consuming. A database tester (or DB tester for short) has to detect a problem, determine why it happened, set up an environment to reproduce it, and then create a fix to resolve the problem. In many cases, problems appear in very complex scenarios, and thus the reproduction of a problem may be complex and difficult to understand. This makes the task of finding the root cause of the problem very difficult. As a consequence, a very time-consuming task for DB testers is finding a min-repro, a minimum configuration that reproduces a software problem. Finding a min-repro involves weeding out irrelevant inputs and finding a simpler, or the simplest, way to reproduce a problem. Currently, a great deal of searching for a min-repro is carried out manually, which is both slow and error-prone.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The min-repro finding technique described herein is designed to ease and speed-up the task of finding a min-repro, a minimum configuration that reproduces a problem in a database-related product. Specifically, in one embodiment, the technique simplifies the repro (the original configuration that caused the problem) using transformations in order to find one or more min-repros. One embodiment provides a high-level script language to automate some sub-tasks and to guide the search for simpler configurations that reproduce the problem. Yet another embodiment of the min-repro finding technique provides record-and-replay functionality, and provides an intuitive representation of results and the search space. These tools can save hours of time for both customers and testers to isolate the problem and can result in faster fixes and large cost savings to organizations.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the min-repro finding technique, reference is made to the accompanying drawings, which form a part thereof and which show by way of illustration examples by which the min-repro finding technique described herein may be practiced. It is to be understood that other embodiments may be utilized and structural changes may be made without departing from the scope of the claimed subject matter.

1.0 MIN-REPRO FINDING TECHNIQUE

The following sections provide an introduction to database debugging, an illustration of the min-repro environment, usage scenarios for employing the min-repro finding technique, a description of various features of the technique, and an exemplary process for employing the technique. An exemplary architecture and an exemplary User Interface are also provided.

1.1 INTRODUCTION

Database software is complex along many dimensions, as it is comprised of a large number of features and execution components. An implicit assumption is that underlying database management system (DBMS) services are well tested, reliable and correct.

To ensure bug-free data management services, testing and debugging are two processes that are used hand in hand together. Testing can demonstrate the presence of a "bug," and debugging is used to identify what caused it and how to fix it. Too often, the starting point for the debugging process is a very large setup configuration with many irrelevant inputs and variables. This is a consequence of either automatic randomized test generators, or real-world application scenarios. Of course, the shorter and more concise is the setup to reproduce a problem, the more likely it is that a tester will understand the root cause of the problem and effectively fix it. Conceptually, testers try to obtain a min-repro, i.e., a simpler or the "simplest possible" version of the input variables that still reproduce the original problem. Further removing or simplifying any input in a min-repro would make the problem not reproduce any longer.

Currently, there seems to be a missing link between testing (where a problem is found) and debugging (where the bugs are fixed). The present min-repro finding technique fills this gap in the database context with a system designed to weed out irrelevant inputs and simplify relevant inputs in a repro (a configuration that reproduces a problem) to ultimately find a min-repro (a simpler, or the simplest, configuration that reproduces the problem).

1.2 THE MIN-REPRO ENVIRONMENT

A min-repro environment can be described as follows.
Min Repro Given a configuration C composed of a set of inputs $\{i_1, i_2 \ldots i_n\}$ (e.g., queries, indexes, etc.), a set of database execution components $\epsilon$ and a problem specification P, find the minimum set of inputs or input configuration C' that reproduces the problem P and removing or simplifying any input in the configuration C' cannot reproduce the problem P any longer.

Figure 1:
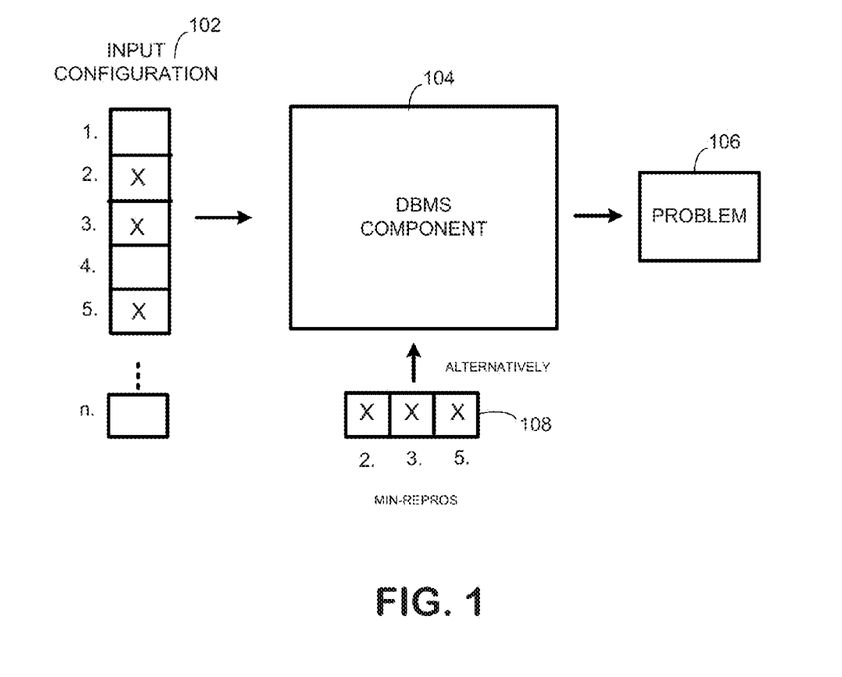
FIG. 1 is an illustration of an environment where a min-repro configuration is sought.

FIG. 1 illustrates the min repro environment. Here an input configuration C 102 on the left hand-side consists of a set of inputs $\{1 \ldots n\}$. A Database Management System (DBMS) component 104 takes this set of inputs 102 and produces an output 106, which is considered by a user (e.g., a DBA or a DB tester) as a "problem" or a "failure". The set of inputs in C 102 may contain many inputs that are irrelevant to the problem cause, i.e., their presence (or lack of presence) will not make any difference in whether the problem will appear or not. Hence the user needs to see only those inputs that are relevant to reproduce the problem 108 (e.g., inputs 2, 3 and 5 in FIG. 1). Moreover, in many cases, it may be far more beneficial to the user to see the "simplest possible" version of the inputs in order to reproduce the same problem.

In one embodiment, the technique focuses on two database-specific input types, namely Data Manipulation Language (DML) statements (e.g., SQL queries) and physical structures (e.g., indexes). For example, a generic structure of a SQL query can be as follows:

```
SELECT DISTINCT <list of columns>
FROM <list of tables>
WHERE <list of Boolean Factors>
GROUP BY <list of columns>
HAVING <list of Boolean Factors>
ORDER BY <list of columns>;
```

For simplicity of presentation, an index physical structure is considered in the following discussion, however other physical structures can be handled similarly by the min-repro finding technique. Indexes consist of a sequence of key columns optionally followed by a sequence of suffix (include) columns and can be described using SQL as follows:

```
CREATE INDEX <name> ON <table name>
(<list of key columns>)
INCLUDE (<list of include columns>);
```

1.3 USAGE SCENARIOS

The present min-repro finding technique can be used for various purposes, such as DBMS testing and debugging, benchmarking and privacy-preserving technical assistance.

In any testing or debugging domain, when it comes to problem repeatability it is desirable to reduce a problem to the smallest and least complicated number of steps that can produce the bad result. Once the problem is reproducible and the fix is created, the min-repro configuration may become a part of an automated test suite for future testing and verification that the problem is not recurring.

Min-repros can also be used for software benchmarking. For example, min-repros can also be used to isolate the root cause of performance difference between successive releases of a database engine, or even to crisply contrast the performance/capabilities of different engines.

Often, corporations or enterprises encounter issues in their environments and need assistance from their database vendor. This naturally raises a number of legal and technical issues that must be addressed to preserve private and business-sensitive information through the control of the information flow amongst different entities. One embodiment of the min-repro finding technique can serve as a technical solution for preserving privacy in DBMS technical assistance. In order to not reveal business-sensitive information, an enterprise can create a smaller and simpler, and information-preserving configuration for the vendor to reproduce the same problem.

1.4 DEFINITIONS

Below several definitions used in the rest of the specification are introduced. These include a definition of a test function that determines whether a problem occurs or not, the definition of a problem-reproducing configuration and the definition of a minimum problem reproducing configuration.
Definition 1. (Test Function) The test function: $F(C, \epsilon, P) \rightarrow \{T, F\}$ determines for an input configuration C and environment $\epsilon$ whether problem P occurs or not.
Definition 2. (Min Reproducing Configuration) A problem-reproducing configuration C is minimal if $F(C, \epsilon, P)$ holds and $\forall, C' \subset C, F(C', \epsilon, P)$ does not hold.
The definition above can be similarly applied to simplification of the internal structure/content of the inputs.

1.5 DETAILS

Figure 2:
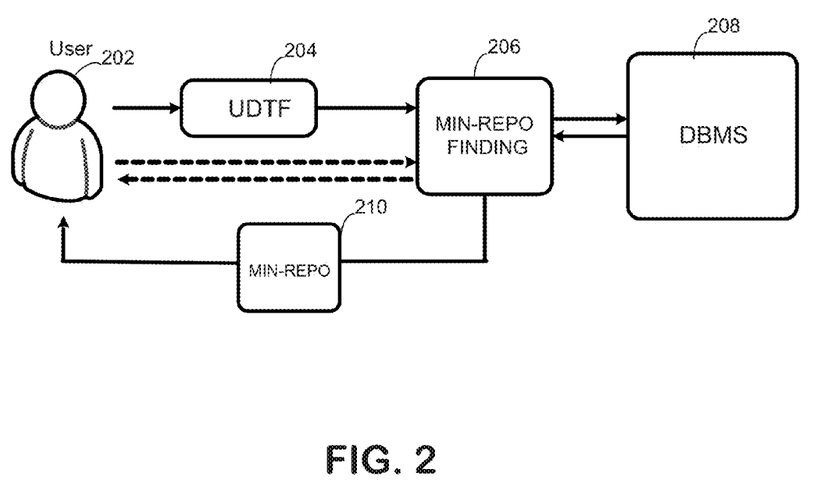
FIG. 2 illustrates a high level overview of one embodiment of the min-repro finding technique.

FIG. 2 illustrates a high level overview of one embodiment of the min-repro finding technique. A DB tester 202 creates a user-defined test function (UDTF) 204, describing the original repro (e.g., a set of inputs, the execution components in the database and the specification of a problem). The UDTF is taken as an input in a min-repro finding module, as shown in block 206. The min-repro finding module 206, executes a search algorithm interacting with a Database Management System (DBMS) 208, prompts the DB tester 202 for feedback (if applicable) to guide the search for a min-repro configuration, as shown in block 206, and finally returns a min-repro 210 for the problem specified in the UDTF as a result.

1.5.1 Feature Set

The min-repro finding technique provides many useful tools for testing and debugging database problems. These will be discussed in the paragraphs below.

1.5.1.1 Specification of an Initial Repro and a Problem:

The initial (large) repro is the initial configuration that creates the problem. In one embodiment of the min-repro finding technique, the problem is specified using a user-defined test function (UDTF). The UDTF allows users to specify the repro information and has the following three main parts: (1) a set of inputs (e.g., a complex query workload and a set of indexes), (2) a set of execution components (e.g., successive releases of a database engine), and (3) a set of rules describing the problem (e.g., the new engine performs worse by more than 10% compared to the old one). For example, in one embodiment, users can specify a UDTF using XML language or using a declarative language like SQL as illustrated below.

```
CREATE UDTF <name>
WHERE
INPUTS = {
   (CREATE INPUT <name>
   WHERE TYPE = <type> ANDVALUE = <value>) ... }
EXE COMPONENTS = {
   (CREATE EXE COMPONENT <name>
   WHERE PARAMETERS = <parameters> AND
   VALUE = <value>) ... }
PROBLEM = {
   (IF EXE COMPONENT <name> = <value> ...)
   (IF EXE COMPONENT <name> <>
   EXE COMPONENT <name> ...) ... }
```

1.5.1.2 Sessions.

In one embodiment of the technique, each UDTF can be executed in a separate session with a unique identity or identifier. The session information can be saved and associated with the UDTF. The identifier, then, can be used to reload the session as and when needed. The sessions make the comparison of different runs (for the same UDTF) possible.

1.5.1.3 Modifications.

In order to find the minimum configuration that reproduces a problem, modifications to the initial configuration (repro) can be carried out via transformations. In one embodiment of the technique, there are two types of transformations, namely inter-transformations that are applicable to a set of inputs and intra-transformations that applicable to the "internal" content of an input. Inter-transformations are applied to whole inputs, e.g., removing a query from the input workload. Intra-transformations are more fine=grained and input-specific, e.g., query or index intra-transformations. A more detailed explanation of inter-transformations and intra-transformations follows.

1.5.1.3.1 Inter-Transformations.

Inter-transformations are used to find a simpler configuration that will reproduce the problem sought to be reproduced. The inter-transformations supported by one embodiment of the technique are illustrated in Table 1. They include removing inputs, making inputs immutable and partitioning inputs. Details of the inter-transformations follow.

TABLE 1

Inter-Transformations

| Macros | 1. Remove inputs. |
| | 2. Make inputs immutable. |
| | 3. Partition inputs. |

(a) Removal: Any input i in a configuration C can be removed to obtain a new configuration $C'=C-\{i\}$.

(b) Immutability: Inputs i in a configuration C can be made immutable (to transformations). This may be useful, when no more simplification of certain inputs is desired.

(c) Partitioning: Inputs i in a configuration C can be partitioned into a set of input groups to obtain a set C* of new configurations $C^*=\{\{C1\},\{C2\}...\}$ where $\forall C_i \in C^*, C_i \subset C$ and $\cup C_i = C$. C* is the set of partitions of $C_i$ which consists of C1, C2, etc. The restriction $\cup C_i = C$ says that the union of all $C_i$ is the same as the original configuration C.

1.5.1.3.2 Intra-Transformations:

Intra-transformations depend on the input type, e.g., query intra-transformations and index intra-transformations. The intra-transformations supported by one embodiment of the technique are illustrated in Table 2. They include query intra-transformations that are macros (e.g., SELECT simplification, FROM simplification, WHERE removal, WHERE simplification, GROUP BY simplification, GROUP BY removal, ORDER BY simplification, ORDER BY removal. Sub-query simplification and Sub-query removal) and custom transformations that are based on a SQL parse tree.

Figure 3:
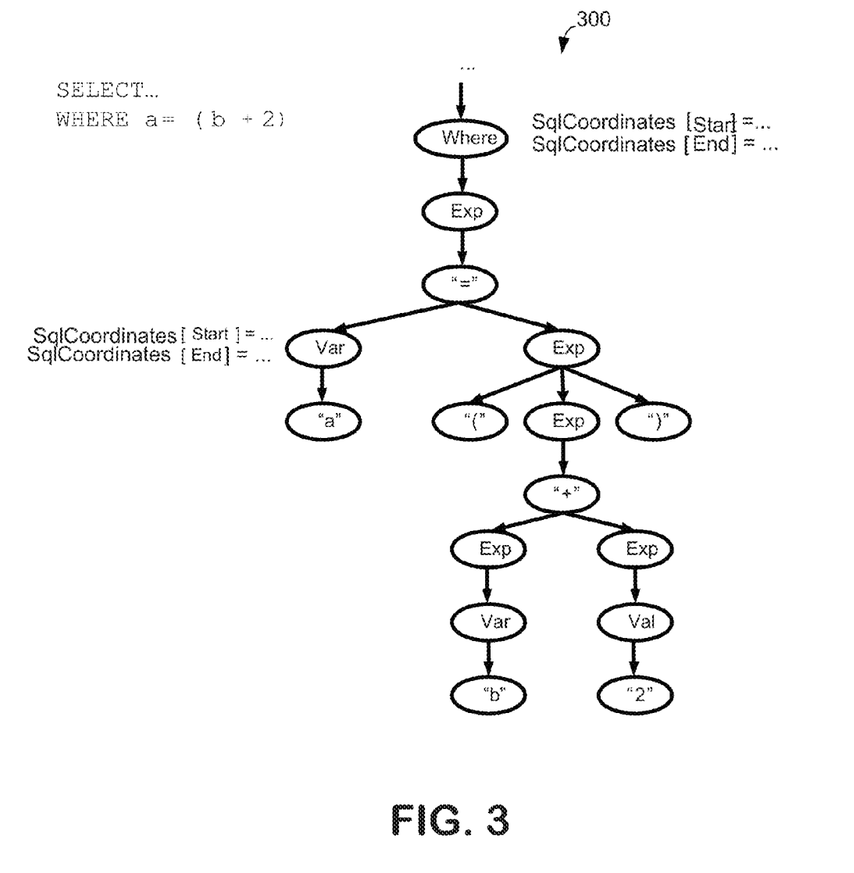
FIG. 3 illustrates an example of a simple parse tree, a WHERE clause expression, which is employed in one embodiment of the min-repro finding technique.

More specifically, in addition to transformations defined as macros, users can perform arbitrary intra-transformations on queries using a SQL parse tree. In one embodiment the technique employs a general SQL parser to parse an SQL statement into the parse tree. Then a visual representation of the parse tree of the current SQL query is exposed to the user, which contains detailed information about the SQL statement such as its type (SELECT, INSERT, UPDATE, DELETE or CREATE, etc.), which tables and fields are used in the statement, and different parts of the SQL statement are also available such as a WHERE clause, GROUP BY clause, HAVING clause, and so on. The user can select any node in the hierarchical parse tree and select a transformation (e.g., edit, remove, simplify) to be applied to the node and its children. FIG. 3 illustrates an example of a simple parse tree 300—a WHERE clause expression. A query intra-transformation, for instance, can be performed using a SQL parse tree. A visual representation of the query parse tree is exposed to the user, and the user can select a node in the parse tree and a transformation (e.g., edit, remove, simplify) to be applied to the node and its children.

TABLE 2

Intra Transformations

Query Intra-transformations

| Macros | 1. SELECT simplification |
| | 2. FROM simplification |
| | 3. WHERE removal |
| | 4. WHERE simplification |
| | 5. GROUP BY simplification |
| | 6. GROUP BY removal |
| | 7. ORDER BY simplification |
| | 8. ORDER BY removal |
| | 9. Sub-query simplification |
| | 10. Sub-query removal |
| Custom | 11. SQL parse-tree based |

Index intra-transformations

| Macros | 1. Column removal |
| | 2. Column order change |
| | 3. Column conversion |
| | 4. Column value change |

1.5.3 Search Strategy

Once the configurations are defined, a search can be made for one or more min-repros that create the problem that is sought to be reproduced. In one embodiment, the main steps of a min-repro search are as follows:

1. Simplify: Partition input set into subsets or simplify an input/or inputs. Both operations results in a "simpler" input configuration.
2. Test: Test the simpler configuration (in the case of partitioning, test the subsets).
3. Choose: Continue the search with a simpler configuration (e.g., a subset) that reproduces the problem.
4. Backtrack: if the current simpler configuration (e.g., no current subset) does not reproduce the problem, backtrack to a previous configuration that reproduces the problem and try another simplification method.

Users can specify the search strategy, by manipulating the following logical steps: (1) how to simplify (e.g., how to partition input set into subsets and how to simplify each input), (2) what to test (e.g., which "simpler" subset to test), (3) what to keep (if multiple simpler configurations reproduce the problem, which configuration should the search continue with), (4) when and where to backtrack (if the problem can no longer be reproduced after a simplification, which earlier state to backtrack to).

The strategies for simplifying, partitioning, testing and handling of multiple min-repros are described in Tables 3-6. Table 3 illustrates strategies for simplifying a repro (a configuration that reproduces a problem). These involve partitioning the initial configuration first and then testing different subsets of the initial configuration; or simplifying individual inputs first and then partitioning the inputs.

TABLE 3

| Simplification Strategies | |
|---|---|
| Heuristic | Description |
| Partition-First | Partition configuration first, then test different subsets |
| Simplify-First | Simplify individual inputs first and then proceed with partitioning |

Table 4 illustrates strategies for partitioning a repro configuration that reproduces a problem. These include partitioning into n subsets, partitioning randomly, partitioning by input similarity, and partitioning by a rank function.

TABLE 4

| Partitioning Strategies | |
|---|---|
| Heuristic | Description |
| Partition by n. | Partition into n subsets |
| Partition randomly. | Partition randomly. |
| Partition-by-similarity | Partition by input similarity |
| Partition-by-rank | Partition by rank function |

(a) Partition by n. In one embodiment of the technique, when partitioning by n, the technique breaks the current input configuration into n subsets. If there are different input types, each type is partitioned into n subsets.

(b) Partition random by n. In one embodiment of the technique, when partitioning randomly by n, the technique partitions current input configuration into n random subsets. One alternative is random partitioning, in which groups of inputs are formed by randomly selecting which input goes into which partition. The advantage in random partitioning is that it is generally less work to construct test partitions.

(c) Partition by similarity. Isolating problem-reproducing code changes can greatly profit from syntactic knowledge. All changes belonging to one class or one method can be combined, thereby reducing the amount of unresolved tests that occur during the minimization process. This is where a "similarity" function (per input type) becomes useful. This partitioning approach is similar in spirit to Equivalence Partitioning, Category Partition, and Domain Testing which are based on the model that the input space of the test object may be divided into subsets based on the assumption that all points in the same subset result in a similar behavior from the test object. This is called partition testing. Typically, in partition testing, the tester identifies test suites by selecting one or a few cases from each subset. The goal is to minimize the number of tests to run, yet to have a sufficient coverage. In one embodiment of the min-repro finding technique partitioning by similarity is used.

(d) Partition by rank. In one embodiment of the technique, inputs are characterized with respect to a certain rank function (e.g., input size), and then subsets are formed based on the rank of the inputs (e.g., all subsets must have a size $\leq \theta$, where $\theta$ is a size threshold).

Testing strategies determine which subset(s) should be tested. This is where domain-specific combination strategies can become useful. Search can benefit from choosing "interesting" (for the current problem specification) inputs combinations. For example, one embodiment of the technique employs a "choose random" and "choose custom" testing strategy. While the latter chooses subsets based on a custom heuristic, the former randomly selects subsets of inputs for testing.

TABLE 5

| Testing Strategies | |
|---|---|
| Heuristic | Description |
| Choose-random | Random selection strategy |
| Choose-custom | Custom heuristic |

Table 6 depicts strategies to deal with multiple independent subsets that each reproduce the problem. First-repro stops testing subsets after finding one that fails, where smallest-repro tests all subsets before deciding which one, among those that failed, to choose

TABLE 6

| Strategies to Deal with Multiple Repros (Configurations that Create a Problem) | |
|---|---|
| Heuristic | Description |
| First-Repro | Continue with the first failing subset |
| Smallest Repro | Continue with the smallest falling subset. |

1.5.6 Test Script Language

In one embodiment, the technique allows a user to create scripts to expedite finding the min-repros (the minimum configurations that reproduce the problem sought to be duplicated). A high-level script language allows users to create custom scripts that are re-usable. In one embodiment, the technique script language, called TLDB (short for Test Language for Databases), uses XML as its primary syntax and is similar in spirit to the XML Expression Language (XEXPR) language. TLDB has several extensions (functions and keywords) specific to the problem domain. Using TLDB, test scripts can be created, and similar to transformations, can be applied to either a set of inputs or a particular input. Scripts encapsulate a general logic that can be then employed in the search for a min-repro in different scenarios. Existing algorithms (e.g., delta debugging) can be implemented in TLDB.

Figure 4:
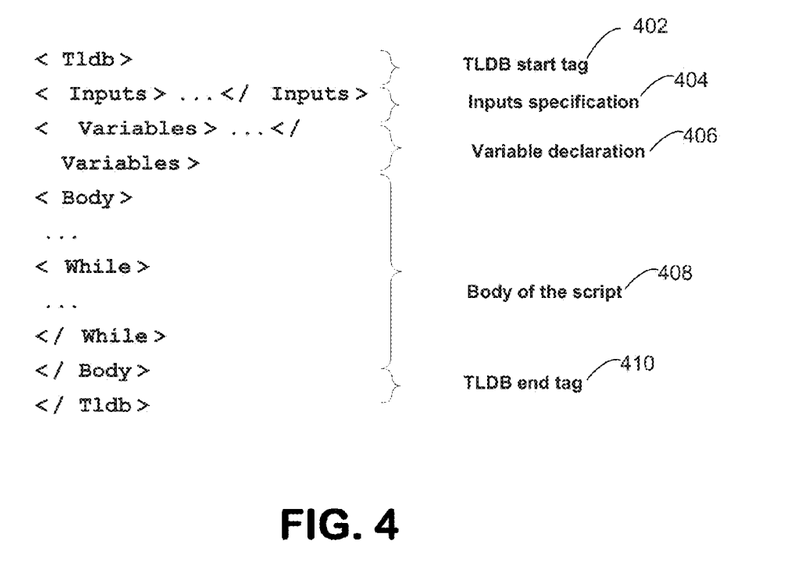
FIG. 4 illustrates a general structure of a Test Language for Databases (TLDB) script, which is employed in one embodiment of the min-repro finding technique.

FIG. 4 illustrates a general structure of a TLDB script employed in one embodiment of the min-repro finding technique. Each script begins and ends with a tag <Tldb> 402. First, all inputs that are present in the current configuration are specified 404 and all variables used in the script are declared 406. (The current configuration is the input configuration at the time of the script invocation. It does not need to be the initial input configuration with which the user has started the min repro search). All variables have a global scope and must be defined before the body of the script 406. The body of the script 408 then follows. The elements of the language are themselves XML tags, e.g., <If>, <While>, <For>, etc. The test scripts written in TLDB, similar to transformations, can be applied to either a set of inputs (inter-scripts) or a particular input (intra-scripts). The script then ends in a TLDB end tag 410.

1.5.7 Simplify by Example Patterns

An intuitive way of debugging is when a user has tried a number of steps over time for similar problems and they have reproduced the wanted results. In one embodiment, the technique features "simplify-by-example," which records user actions, generalizes them into a pattern, which is then available for replay, in either a manual min repro search or as a part of a script.

1.5.8 Visualization of Search Space and Test Results

Figure 5:
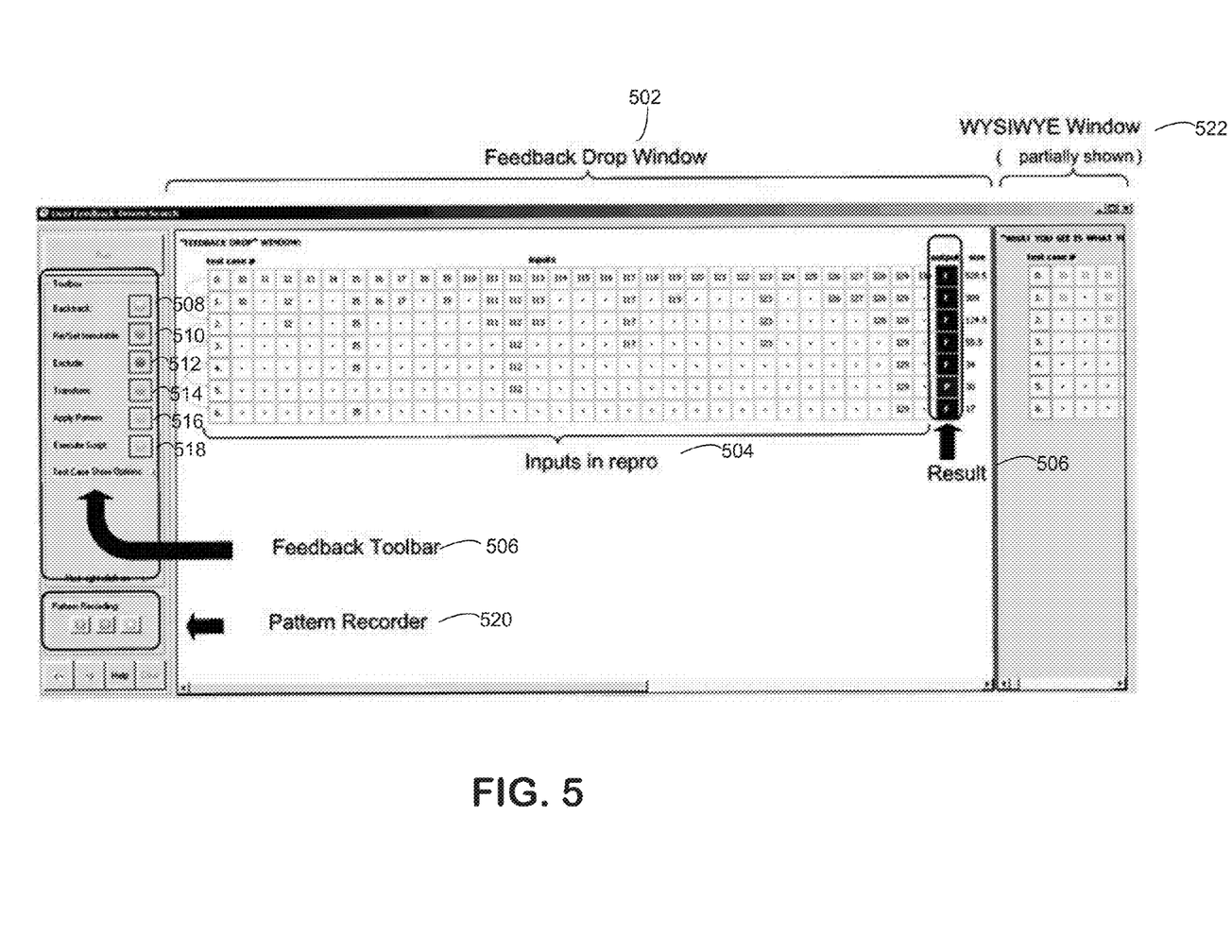
FIG. 5 depicts an exemplary User Interface (UI) employed in one embodiment of the min-repro finding technique.

Simply knowing which repro is reproducing a problem is one thing, but presenting it in an intuitive and understandable manner (especially in complex scenarios) is another. A singularly bad feature of many current debugging systems is the lack of attention that has been paid to the aspects of the debugging interface. In one embodiment, the min-repro finding technique employs a User Interface (UI) that provides a simple visualization of the search space and search results that can help DB testers in understanding what might have caused a given problem. An exemplary UI 500 employed in one embodiment of the technique is shown in FIG. 5. This UI 500 includes a feedback drop window 502 where the inputs for the repro (initial configuration that caused the problem) 504 and the result of using one or more of the inputs 506 are displayed. The UP 500 also includes a feedback tool bar 506 which includes buttons for such actions as backtrack 508, re/set immutable 510, exclude 512, transform 514, apply pattern 516 and execute script 518. Further, the UI includes a pattern recorder 520, that can record a series of user actions for later playback. Finally, the UI contains a WYSIWYE window 522 that shows the user the transformations that they applied and what it is about to being tested in the current iteration. The UP 500 can facilitate in users providing a better feedback to the search strategy, thus creating a better "dialogue" between a tester and the min-repro search system and can help find the min-repro faster.

1.6 EXEMPLARY ARCHITECTURE EMPLOYING THE MIN-REPRO FINDING TECHNIQUE

Figure 6:
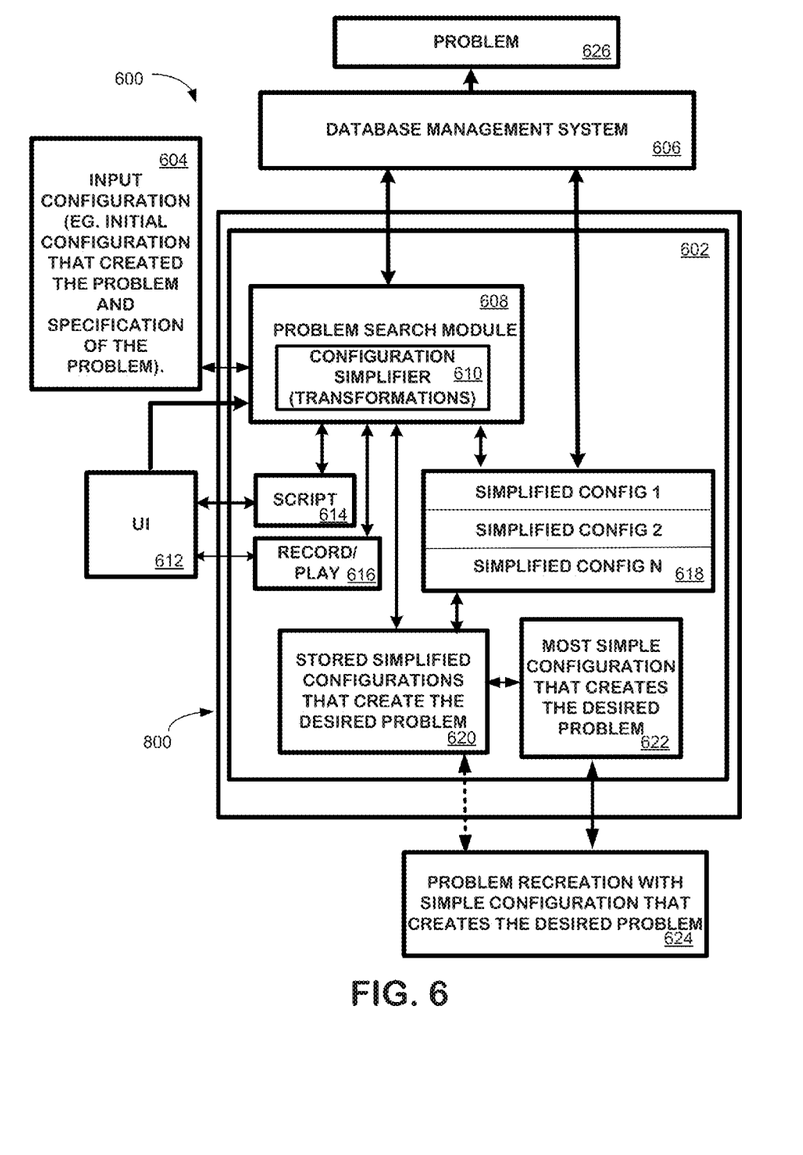
FIG. 6 is an exemplary system architecture in which one embodiment of the min-repro finding technique can be practiced.

FIG. 6 provides one exemplary architecture 600 in which one embodiment of the min-repro finding technique can be practiced.

As shown in FIG. 6, block 602, the architecture 600 employs a min-repro finding module 602, which typically resides on a general computing device 800 such as will be discussed in greater detail with respect to FIG. 8. The initial configuration 604, in one embodiment consisting of the initial configuration that created the problem and a specification of the problem, is input into the min-repro finding module 602.

A problem search module 608 employs a configuration simplifier (block 610) that simplifies the original configuration into simplified configurations (block 618), such as, for example by using the transformations and simplification methods previously discussed. A user can provide input to the configuration simplifier 610 in order to facilitate creating simplified configurations 618 to be used in finding one or more min-repros. A user can also use a UI (block 612) to input a script (block 614) specifying what actions to take when determining whether a simplified input configuration (block 618) is a min-repro or not. Alternately, the UI (block 612) can be used to record and playback a set of user actions (block 616).

The problem search module 608, using a simplified configuration (block 618) and the database management system (block 606) tests to see if the simplified input configuration reproduces the problem (block 626). If so, the simplified configuration is stored (block 620). Otherwise the simplified configuration is discarded. The most simple configuration (block 622) or one of the stored simplified configurations (block 620), can then be used to recreate the problem (block 624), such as, for example, in order to determine the cause of the problem and fix it.

1.7 EXEMPLARY PROCESSES EMPLOYED BY THE MIN-REPRO FINDING TECHNIQUE

Figure 7:
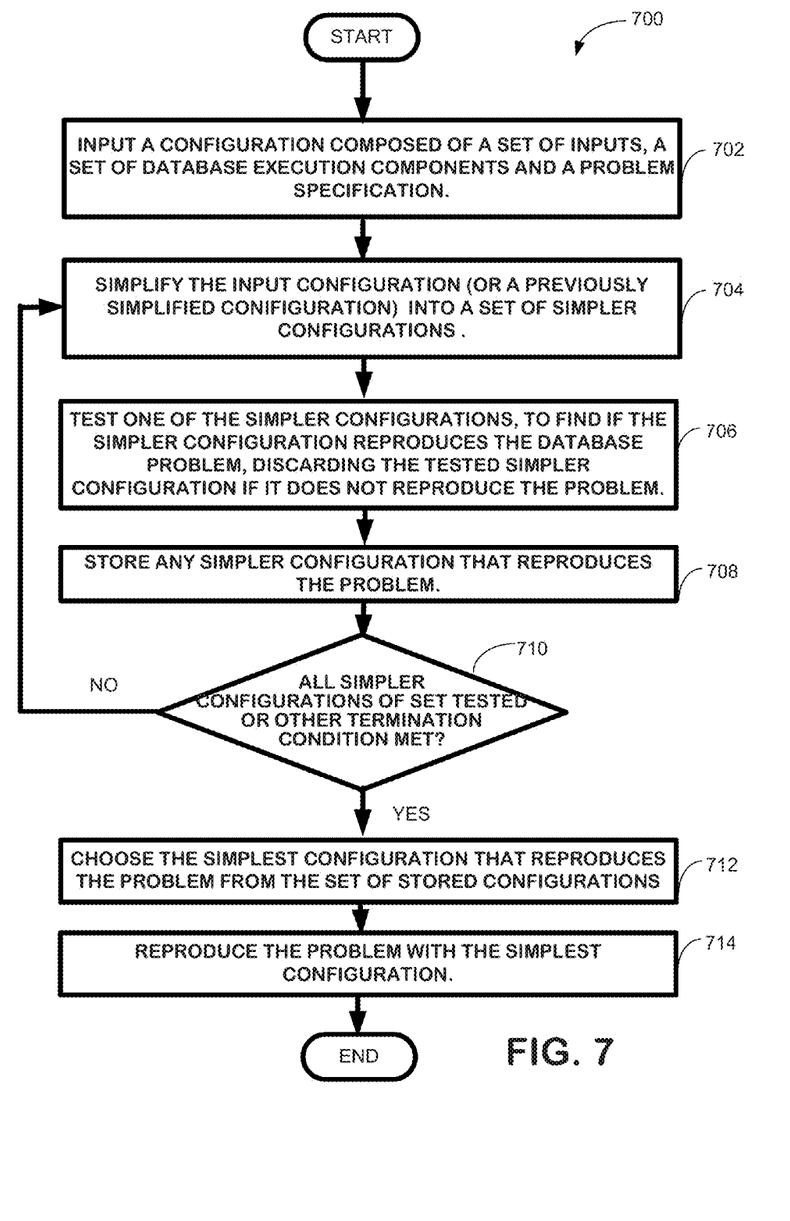
FIG. 7 is a flow diagram depicting an exemplary embodiment of a process for employing the min-repro finding technique.

An exemplary process 700 employing the min-repro finding technique is shown in FIG. 7. As shown in FIG. 7, block 702, a configuration composed of a set of inputs, a set of database execution components and a problem specification is input. The input configuration is simplified into a set of simpler configurations, such as for example, by partitioning or simplifying the input configuration as discussed previously, as shown in block 704. It should be noted that one of the simpler configurations can be a previously simplified configuration which is further simplified. Once a simpler configuration is selected, the simpler configurations is then tested, to find if that simpler configuration reproduces the database problem (block 706). If that simpler configuration does not reproduce the database problem it is discarded (block 706). If that simpler configuration does reproduce the problem, it is stored (block 708). Another simpler configuration is then chosen and blocks 704 though 710 are repeated until all simpler configurations have been tested or a desired termination condition has been met. The simplest configuration is then chosen from the stored simple configurations that reproduces the problem to reproduce the problem (blocks 712, 714).

1.8 ALTERNATE EMBODIMENTS

Various alternate embodiments of the technique are possible. The following paragraphs describe alternate embodiments of the min-repro finding technique.

1.8.1 Machine Learning-based Enhancements.

In one embodiment, the technique "learns" from earlier test results to guide its future strategy for min repro finding. For example, the technique can learn which transformation activities are most useful to a given situation and provide guidance to the user. As an example, if in previous debugging sessions it was found that simplifying the WHERE clause of the queries was useful, while removing indexes was not, this knowledge can be presented to the user to help make better decisions.

1.8.2 Extending Min Repro Support to Data.

Besides considering only queries and indexes as input, one embodiment of the technique considers data (stored in a database). It considers data as another input type and devises a set of "Data-based" simplification transformations (e.g., row-pruning, column pruning) on data tables that can find a min repro given data input—i.e., to find a minimum data (set) that can reproduce a certain problem.

1.8.3 Correlation of Transformations.

One embodiment of the technique considers the correlation between the inputs when choosing simplifying transformations, e.g., when simplifying an index, it considers which queries it will affect and the simplification transformations that have been performed on those inputs. One embodiment of the min-repro finding technique ranks different transformations based on their impact on the rest of the input configuration.

2.0 THE COMPUTING ENVIRONMENT

The min-repro finding technique is designed to operate in a computing environment. The following description is intended to provide a brief, general description of a suitable computing environment in which the min-repro finding technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 8:
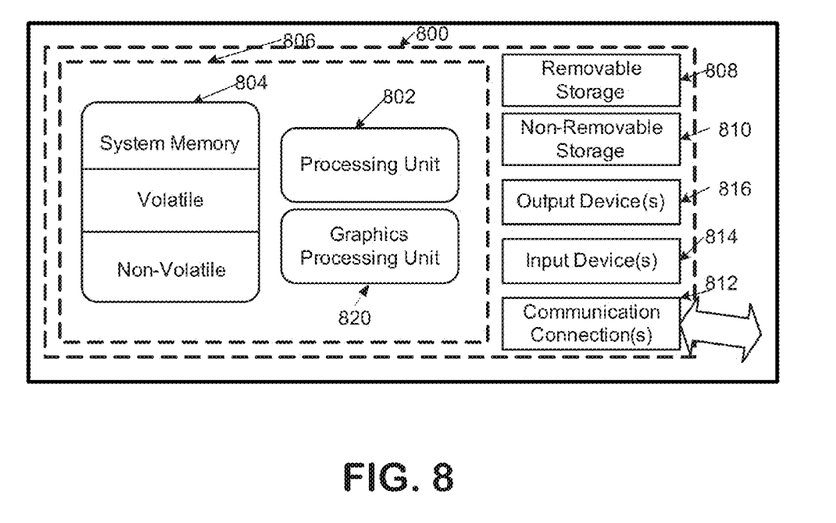
FIG. 8 is a schematic of an exemplary computing device which can be used to practice the min-repro finding technique.

FIG. 8 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 8, an exemplary system for implementing the min-repro finding technique includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of Computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Device 800 also can contain communications connection(s) 812 that allow the device to communicate with other devices and networks. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 800 may have various input device(s) 814 such as a keyboard, mouse, pen, camera, touch input device, and so on. Output device(s) 816 include devices such as a display, speakers, a printer, and so on may also be included. All of these devices are well known in the art and need not be discussed at length here.

The min-repro finding technique may be described in the general context of computer-executable instructions, such as program modules, being executed by a computing device. Generally, program modules include routines, programs, objects, components, data structures, and so on, that perform particular tasks or implement particular abstract data types. The min-repro finding technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for semi-automatically finding a minimum set of configurations that reproduces a database problem, comprising:
   (a) inputting a configuration comprising a set of inputs, a set of database execution components and a problem specification;
   (b) simplifying the input configuration comprised of the set of inputs, the set of database execution components and the problem specification or a previously simplified input configuration into a set of simpler configurations;
   (c) testing one of the simpler configurations, to find if the simpler configuration reproduces the database problem;
   (d) storing any simpler configuration that reproduces the problem;
   (e) choosing another simpler configuration, and repeating (b) through (d) until all simpler configurations have been tested or a desired termination condition has been met; and
   (f) choosing the simplest configuration from the stored simple configurations that reproduces the problem.

2. The computer-implemented process of claim 1 further comprising simplifying the input configuration or the previously simplified input configuration by partitioning to create a set of simpler configurations.

3. The computer-implemented process of claim 1 further comprising simplifying the input configuration or the previously simplified input configuration by removing portions to create the set of simpler configurations.

4. The computer-implemented process of claim 1, further comprising simplifying the input configuration previously or the simplified input configuration by specifying portions as immutable to create the set of simpler configurations.

5. The computer-implemented process of claim 1, further comprising reducing the number of the set of inputs to create the set of simpler configurations.

6. The computer-implemented process of claim 1, further comprising modifying the content of the set of inputs to create the set of simpler configurations.

7. The computer-implemented process of claim 1, further comprising partitioning the input configuration or the previously simplified input configuration first and then transforming the content of different subsets of the input configuration or the previously simplified input configuration.

8. The computer-implemented process of claim 1, further comprising modifying portions of the input configuration or the previously simplified input configuration first and then partitioning the input configuration or the previously simplified input configuration to create the set of simpler configurations.

9. The computer-implemented process of claim 2, further comprising partitioning the input configuration or the previously simplified input configuration by similarity, by rank function or randomly into a given number of subsets.

10. The computer-implemented process of claim 6, further comprising modifying the content of inputs comprising indexes, queries or data in a database tables.

11. The computer-implemented process of claim 10, further comprising modifying an index input by removing one or more columns, altering the order of columns, performing a column conversion or changing a value in a column.

12. The computer-implemented process of claim 10, further comprising modifying an query input by simplifying or removing FROM, WHERE, SELECT, GROUP BY, ORDER BY or sub-query clauses.

13. The computer-implemented process of claim 10, further comprising modifying data in a database by uniformly sampling data or applying any user defined filter that restricts the set of tuples in the database.

14. A system for finding simpler configurations of a configuration that causes a database problem, comprising:
a general purpose computing device;
a computer program comprising program modules executable by the general purpose computing device, wherein the computing device is directed by the program modules of the computer program to,
(a) input an initial configuration that created a database problem comprising a set of inputs, a set of database execution components and a specification of the problem;
(b) simplify the initial configuration comprising the set of inputs, the set of database execution components and a problem specification or a previously simplified configuration into a set of simplified configurations;
(c) for each simplified configuration of the set of simplified configurations, use the simplified configuration and a database management system to test to see if the simplified input configuration reproduces the problem;
(d) if a tested simplified configuration reproduces the problem, store the simplified configuration;
(e) use one of the stored simplified configurations to recreate the database problem.

15. The system of claim 14, further comprising a module to allow a user to input a script specifying what actions to take when simplifying the initial input configuration or the previously simplified input configuration.

16. The system of claim 14, further comprising a module to allow a user to record and playback user actions.

17. The system of claim 14, further comprising a user interface that allows a user to manipulate data to find a simplified configuration that reproduces the problem, the user interface comprising:
a feedback drop window where the inputs for the initial configuration that caused the problem and the result of using one or more of the inputs are displayed;
a feedback tool bar which includes one or more buttons for backtracking user actions, setting immutable inputs, excluding inputs from input, transforming inputs, applying a pattern to inputs and executing a script;
a pattern recorder that can record a series of user actions for later playback.

18. A computer-implemented process for semi-automatically finding a minimum set of configurations that reproduces a database problem, comprising:
creating a user-defined test function (UDTF) that comprises a set of inputs, execution components in a database and a specification of a problem;
searching for the simplest configuration that recreates the problem using the user-defined test function and a Database Management System (DBMS);
returning the simplest configuration based on the set of inputs that recreates the problem.

19. The computer-implemented process of claim 18, further comprising learning from previous searching actions to facilitate creating the simplest configuration that reproduces the problem.

20. The computer-implemented process of claim 18, further comprising allowing a user to provide input into simplifying the set of inputs to create the simplest configuration that reproduces the problem.

* * * * *